May 26, 1970
A. L. COOK
3,514,341
BATTERY CELL CASE WITH PRESSURE EQUALIZER
Filed May 31, 1968
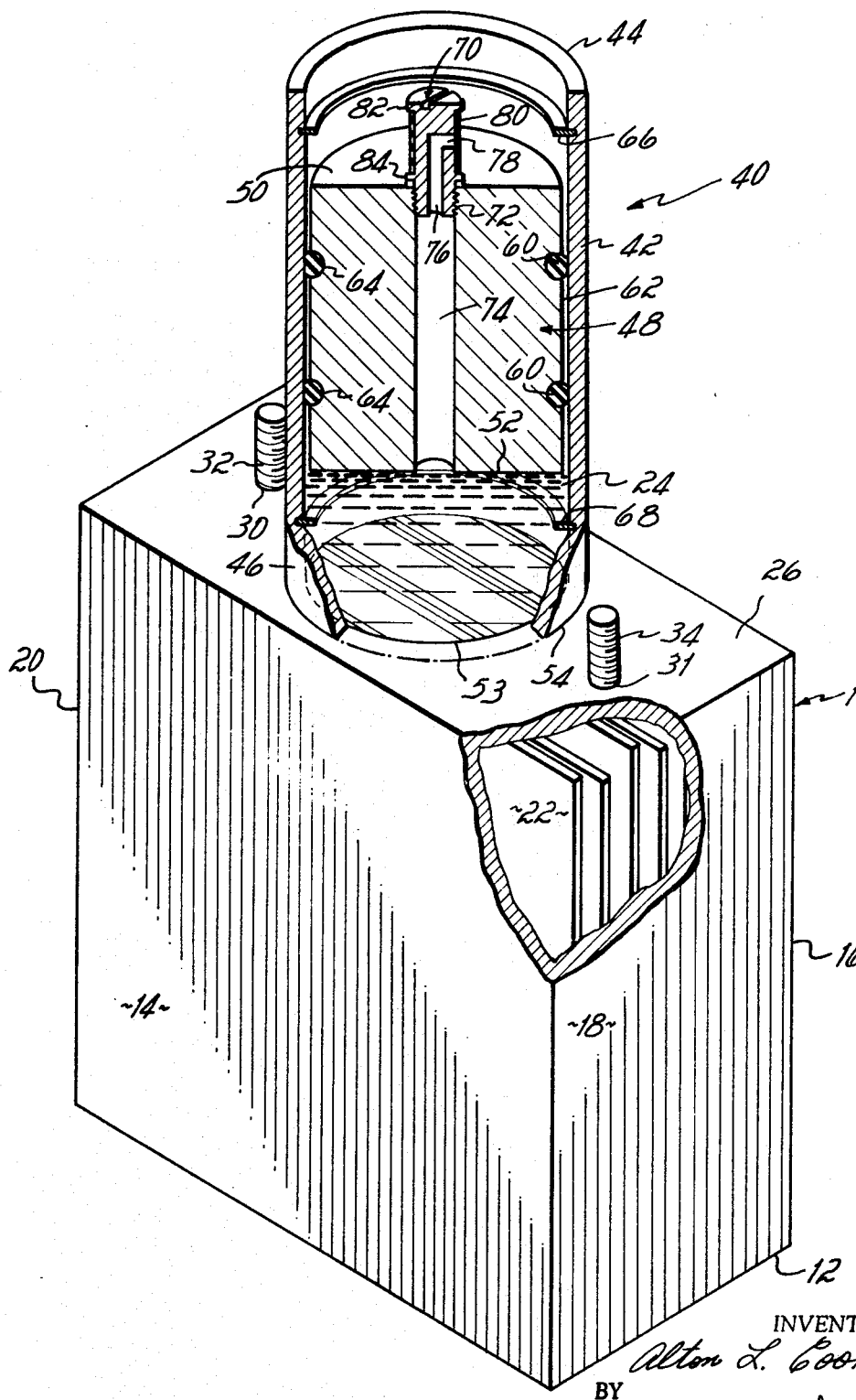
INVENTOR.
Alton L. Cook
BY
Wood, Herron & Evans
ATTORNEYS

United States Patent Office 3,514,341
Patented May 26, 1970

3,514,341
BATTERY CELL CASE WITH PRESSURE EQUALIZER
Alton L. Cook, Joplin, Mo., assignor to Eagle-Picher Industries, Inc., Cincinnati, Ohio, a corporation of Ohio
Filed May 31, 1968, Ser. No. 733,366
Int. Cl. H01m 1/00
U.S. Cl. 136—166                         4 Claims

ABSTRACT OF THE DISCLOSURE

A case for a battery cell having electrodes immersed in a liquid electrolyte, including casing structure configured and dimensioned to completely enclose the electrodes and liquid electrolyte, and a pressure equalization and gas venting device communicating with both the interior of the casing structure and the environment in which the cell is utilized for equalizing the environmental and internal cell pressures while simultaneously venting to the environment gas generated within the cell case.

---

This invention relates to batteries having electrodes immersed in a liquid electrolyte, and more particularly to cell casings for such batteries adapted to house a plurality of electrodes and the necessary liquid electrolyte.

A battery cell of the general type with which the cell casing of this invention finds particular utility typically includes a plurality of stacked electro-chemical couples each including a pair of opposite polarity electrodes immersed in a liquid electrolyte. Between the opposite polarity electrodes of each electro-chemical couple is produced a characteristic voltage the exact magnitude of which depends upon the electrode material. The electrodes are connected to terminals projecting externally from the cell casing, permitting powering of electrical load connected thereacross.

In the manufacture of battery cells, the cell casing which houses the electrodes and electrolyte are generally sealed, providing a self-contained assembly which is both air tight and liquid tight. Sealing has been found to be desirable for the dual purpose of preventing contaminants from entering the cell and adversely affecting the electro-chemical battery action, and preventing the electrolyte contained within the casing from spilling, evaporating, or otherwise leaving the casing interior and entering the external environment. Containment of the liquid electrolyte within the cell prevents short-circuit electrolytic paths from developing between cells when a plurality of cells are series connected to form a battery.

In certain battery applications, it has been found that the typical sealed battery cell construction of the prior art possesses certain disadvantages. Specifically, in underwater applications where the battery cells are immersed in water to depths of hundreds or thousands of feet, it has been found that the large external pressures present at such depths have a tendency to cause the cell to implode, the pressure differential between the casing interior and the environment creating destructive forces far exceeding the strength of the walls of the cell casing. It is possible to prevent damage to the casing by such environmental pressures by constructing the casing walls of a thickness sufficient to withstand the anticipated pressure differential of the particular application. However, such an approach, which might be considered a "brute force" technique, unduly increases the cost of the cell casing, as well as increasing the overall size of the battery cell which in certain instances is very undesirable.

It has been an objective of this invention to provide a casing for cells utilizing liquid electrolytes which can withstand enormous environmental pressures without risk of cell rupture, and yet is constructed with cells walls of conventional thickness. This objective has been accomplished in accordance with certain principles of this invention by modifying a conventional cell casing to include a cylinder communicating at one end with the cell interior and at the other end with the environment, and a piston movable in the cylinder in response to environmental pressure for transmitting to the electrolyte the environment pressure and thereby equalizing the interior cell pressure with the environmental pressure.

In a preferred form of this invention, the modified cell casing is provided with a one-way pressure relief valve, preferably mounted to the piston, for permitting gas generated within the cell to vent to the environment. The pressure differential across the one-way check valve necessary to open the valve and thereby permit gas within the cell to vent to the environment is preferably selected relative to the size of the piston and the frictional drag between the piston and cylinder such that the pressure relief valve opens in response to increases in internal pressure caused by trapped gas before the increases in internal pressure are sufficient to move the piston. In this manner, pressure differentials across the piston attributable to gas-induced pressure changes do not move the piston, the piston being movable only in response to changes in environmental pressure.

Other objectives and advantages of this invention will be more readily apparent from a detailed description of the invention taken in conjunction with the accompanying drawing in which the figure is an enlarged perspective view partially in cross-section of a preferred embodiment of this invention.

The pressure equalized cell casing of this invention includes a cell container 10 having integral bottom wall 12, side walls 14 and 16, and front and rear walls 18 and 20. The walls 12, 14, 16, 18 and 20 are dimensioned and configured to accommodate a plurality of pairs of opposite polarity electrodes 22 and a liquid electrolyte 24. A suitably configured and dimensioned cover 26 functioning as the top wall of the cell container 10 is also provided.

The cell container 10, including cover 26, bottom, sides, front and back walls 12, 14, 16, 18 and 20, may be fabricated of a variety of materials compatible with the electrolyte and the environment in which the battery is utilized. For example, the cell container 10 may be of rigid or semi-rigid plastic, neoprene, rubber, or metal and may be molded, machined, extruded, or otherwise formed into the desired configuration.

Secured in suitably provided apertures 30 and 31 in the cover 26 are electrically conductive cell terminals 32 and 34 which have their lower portions projecting into the interior of the cell container 10 and suitably electrically coupled to the electrode pairs 22 in any well-known manner. The terminals 32 and 34 are hermetically sealed in the cover 26 by potting, thermal welding or like technique.

To provide equalization between the internal pressure of the cell container 10 and the pressure of the environment in which the cell is utilized, a pressure equalization device 40 is provided. The pressure equalization device 40 includes a cylinder 42 open at both its top end 44 and its bottom end 46, and a piston 48 slideably positioned within the cylinder 42 whose upper and lower surfaces 50 and 52 communicate with the environment and the interior of the cell container 10, respectively. The upper piston surface 50 communicates directly with the environment while the lower surface 52 thereof communicates with the cell interior via an aperture 53 formed in the cover.

The open-ended cylinder 42 has its lower edge 54 circumscribing the cover aperture 53 and is secured to the cover 26 in any suitable fashion such as by plastic welding, adhesive, or the like. The cylinder 42, while preferably fabricated of tetrafluoroethylene, may be fabricated of other suitable materials which are compatible with the electrolyte and cell environment. The cylinder 42 preferably has a circular cross-section, although other suitable cross-sections may be used.

The piston 48 has a cross-section similar to that of the cylinder 42 and a diameter slightly less than the internal cylinder diameter to permit a snug sliding fit between the piston and cylinder. Suitable sealing means, preferably in the form of O-rings 60, are provided. The O-rings 60 circumscribe the peripheral surface 62 of the piston 48 and are positioned in shallow circumferential grooves 64. The O-rings and the piston 48, like the cylinder 42 and cell container 10, are fabricated of material compatible with both the electrolyte 24 and the cell environment.

To limit relative sliding motion between the piston 48 and the cylinder 42, upper and lower removable stops 66 and 68 fixedly secured to the cylinder are provided. The stops 66 and 68 may be C-clips fitted in circumferential grooves formed in the interior surface of the cylinder 42 which project radially inwardly a distance sufficient to mechanically interfere with the movement of the piston within the cylinder.

In operation, after electrically connecting the electrodes 22 to the terminals 32 and 34, the electrodes are inserted into the cell container 10 in upstanding face-to-face relation. The cover 26 is then properly positioned on the cell container to enclose the upper end thereof, and secured in place by plastic welding, suitable adhesives or the like.

With the electrodes 22 in the cell container 10, the cover 26 secured in place, and the piston 48 and upper stop 66 removed from their operative position in the cylinder 42, the electrolyte 24 is injected into the cell container 10 by pouring it into the upper end 44 of the cylinder. Preferably sufficient electrolyte is provided to raise the electrolyte level above the lower stop 68. The piston 48 is now inserted in the cylinder 42 and the upper stop 66 positioned in its associated cylinder groove.

Assuming the foregoing assembly of the battery is done under normal atmospheric conditions, the pressure within the cell container 10 is approximately 14.7 pounds per square inch. If the cell container 10 is now placed in an environment where the environmental pressure is in excess of the internal cell pressure, the piston 48 is acted upon by a pressure differential equal to the difference between the environmental and internal cell pressures. Assuming the pressure differential when acting upon the piston 48 produces a force in excess of the frictional drag force between the O-rings 60 and the internal surface of the cylinder 42, the piston 48 moves downwardly. Downward movement of the piston 48 exerts a compressional force upon the electrolyte 24. Piston 48 continues its downward travel in response to the pressure differential until the sum of the frictional drag force between the O-rings 60 and the interior wall of the cylinder and the upward force exerted on the lower piston surface 52 by the compressed electrolyte 24 is equal to the downward force exerted by the environment on the upper piston surface 50. When this occurs, the piston 48 is in equilibrium and its downward motion terminates. At this point the internal pressure of the cell container is substantially equal to the environmental pressure.

The piston 48 moves upwardly to equalize, in a similar manner, the environmental and internal cell pressure should the internal cell pressure exceed the environmental pressure as occurs, for example, when a cell sealed under atmospheric condition is subjected to negative pressure evidenced at altitudes high above the earth.

In the preferred form of this invention, the piston 48 is physically oriented such that gasses generated within the cell accumulate directly beneath and in contact with the bottom surface 52 of the piston, and is provided with a one-way pressure relief valve 70 which permits accumulated gas generated in the interior of the cell container 10 to be vented to the environment. The valve 70 may be of any suitable form and preferably is generally elongated and circular in cross-section having a lower externally threaded portion 72 which cooperates with a suitably internally threaded bore 74 formed in the piston 48 to secure the valve in the piston. The valve 70 is provided with a blind hole 76 which communicates at its lower end with the interior of the cell container 10 via the bore 74 and the bottom end 46 of the cylinder, and its upper end with the environment via a cross bore 78 and the upper end 44 of the cylinder.

A sleeve 80 encircling the upper section of the valve 70 between radially projecting lips 82 and 84 and normally in sealing relationship with the cross bore 78 is provided. The sleeve 80 is fabricated of elastic material and is designed to circumferentially lengthen, unsealing cross bore 78 permitting gas generated in the cell container 10 to be vented to the environment via bores 76 and 78, when the internal pressure of the cell container exceeds the environmental pressure. A reverse pressure differential across the sleeve 80, wherein the environmental pressure exceeds internal cell pressure, urges the sleeve more forcefully in sealing relation to the cross bore 78.

Preferably, the material, dimensions, and configuration of the sleeve 80 are designed such that a circumferential segment of the sleeve 80 moves to a radial position wherein it unseals the cross bore 78 under the action of gas within the cell container 10 before the gas pressure builds up in the cell container sufficiently to overcome the frictional drag between the O-ring 60 and the internal surface of the cylinder 42. With such a design, the piston 48 moves only in response to environmental pressure changes.

If the sleeve 80 is not designed in the preferred manner as described above, increases in internal pressure of the cell container 10 attributable to the generation of gas therein move the piston 48 upwardly until a new equilibrium position is reached instead of stretching the sleeve 80 and venting the gas. Eventually, of course, if the gas pressure build-up within the cell container 10 is sufficient, the piston 48 is moved to its upper limit of travel defined by abutment of its upper surface 50 and stop 66. Further internal gas pressure increases, assuming the stop 66 is sufficiently strong, overcome the sealing force of the sleeve 80, causing it to stretch or deform, venting gas from the cell interior through the cross bore 78.

A sleeve design which permits an internal gas pressure build-up to first move the piston, while not preferred because of the delay in gas venting which it produces, is nonetheless operative and therefore considered within the scope of this invention. Likewise, while placement of the valve 70 on the piston 48 is preferred, placement on a cell container wall or other location below which internally generated gasses may accumulate and be vented, such as the cover 26, is operative and therefore within the scope of this invention.

Having described the invention, what is claimed is:

1. In a battery cell casing having a bottom, side walls, and a cover adapted to enclose opposite polarity electrodes submerged in a liquid electrolyte, the improvement comprising:

a cylinder having a first end communicating with the interior of the cell casing and a second end communicating with the environment;

a piston slideably positioned within said cylinder for movement in response to a pressure differential between said cell casing interior and said environment thereby equalizing the internal cell pressure with said environmental pressure, one-way valve means in said piston for venting gas from said cell interior to said environment when said internal cell pressure exceeds said environmental pressure by a predetermined pressure differential.

2. The improvement of claim 1 wherein said piston and cylinder interact to provide a frictional drag force therebetween sufficient to prevent relative movement of said piston and cylinder in response to said predetermined pressure differential thereby venting said gas to said environment via said one-way valve means without movement of said piston.

3. A battery cell casing for an electro-chemical couple including opposite polarity electrodes and a liquid electrolyte comprising:
 a cell container having a bottom, sides, and top dimensioned and configured to enclose said electrodes and electrolyte:
 structure defining a cylinder having a first end communicating with the interior of said container and a second end communicating with the environment; and
 a piston in said cylinder intermediate the ends thereof and movable in response to a pressure differential between said container interior and said environment for equalizing the pressure in said cell interior with said environmental pressure, one-way valve means in said piston for venting gas from said cell interior to said environment when said internal cell pressure exceeds said environmental pressure by a predetermined pressure differential.

4. The cell casing of claim 3 wherein said piston and cylinder interact to provide a frictional drag force therebetween sufficient to prevent relative movement of said piston and cylinder in response to said predetermined pressure differential thereby venting said gas to said environment via said one-way valve means without movement of said piston.

References Cited

UNITED STATES PATENTS

| 291,465 | 1/1884 | Beeman et al. | |
|---|---|---|---|
| 406,981 | 7/1889 | Amory | 136—182 XR |
| 3,208,884 | 9/1965 | Jensen | 136—178 |
| 3,391,029 | 7/1968 | Orsino | 136—166 |

WINSTON A. DOUGLAS, Primary Examiner

D. L. WALTON, Assistant Examiner

U.S. Cl. X.R.

136—178